Aug. 11, 1936.  G. C. JETT  2,050,845
CRAWLER TREAD MECHANISM
Original Filed May 4, 1931   2 Sheets-Sheet 1
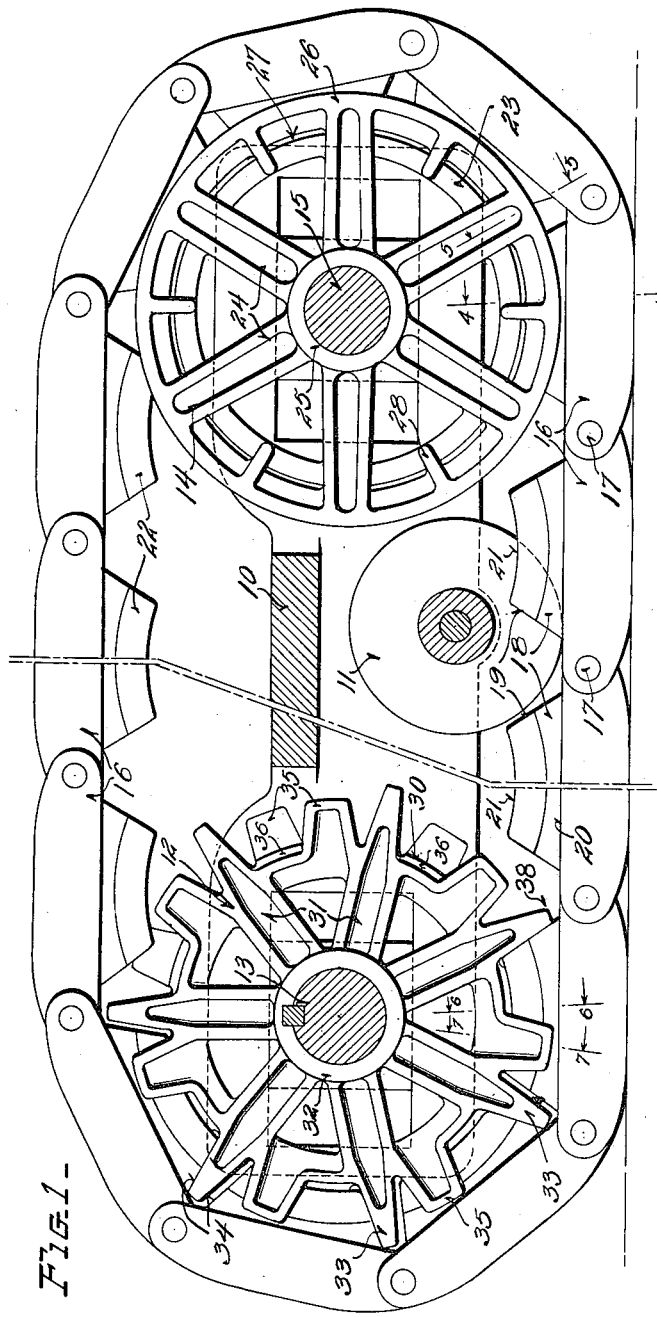
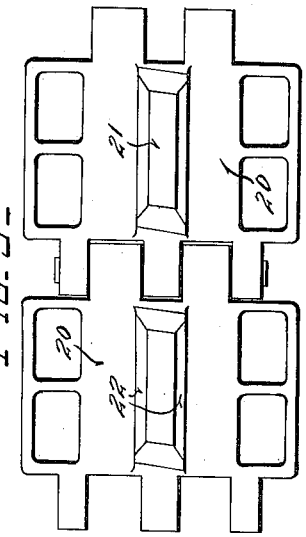
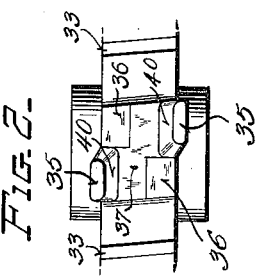
Inventor
GEORGE C. JETT
By
Attorney Aug. 11, 1936.    G. C. JETT    2,050,845
CRAWLER TREAD MECHANISM
Original Filed May 4, 1931    2 Sheets-Sheet 2
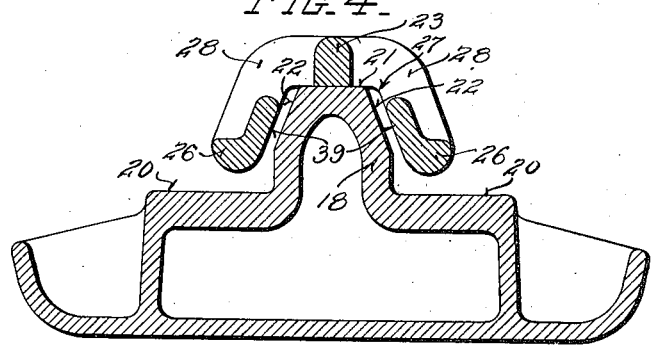
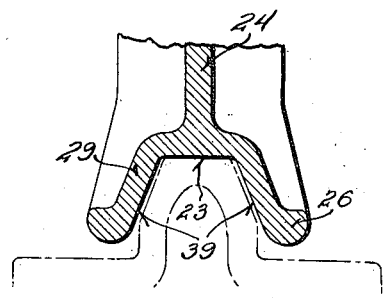
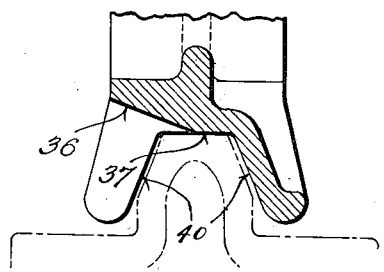    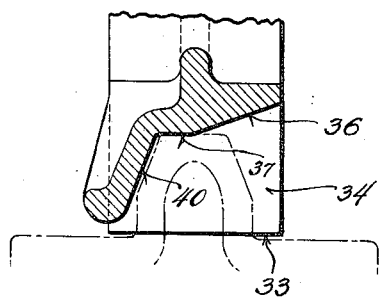
Inventor
GEORGE C. JETT
By Ralph Lukins
Attorney Patented Aug. 11, 1936

2,050,845

UNITED STATES PATENT OFFICE 2,050,845

CRAWLER TREAD MECHANISM

George C. Jett, Milwaukee, Wis., assignor of two-fifths to Walter H. Stiemke, Milwaukee, Wis.

Application May 4, 1931, Serial No. 534,854
Renewed December 21, 1934

14 Claims. (Cl. 305—9)

This invention relates to crawler tread mechanisms and more particularly to improvements in the tread belts and coacting tumblers thereof.

One object of the present invention is the provision of a novel and improved tread belt and tumbler design which will permit the tumblers to assume and sustain substantial portions of the superimposed load in addition to and without impairing their belt guilding and driving functions and without causing undue wear. This I have accomplished by the provision of extended coacting bearing surfaces on the tumblers and tread belts of sufficient area to sustain the transmitted loads, together with means for insuring proper mating of those surfaces during operation. In order to avoid clogging, the coacting bearing surfaces are preferably elevated and of narrow form to facilitate extrusion of dirt, gravel, and other materials therefrom.

Another object is the provision of a novel and improved guiding means between the tread belt and tumblers so designed as to insure against clogging and to provide a quiet easy operation with a minimum of shock, friction, and wear.

Another object is the provision of a tumbler of relatively light weight yet rugged design, which may be economically produced by ordinary casting methods, and which will require very little machining or other expensive finishing methods.

Other objects and advantages will appear from the following description of an illustrative embodiment of the present invention.

Figure 1 is a view in side elevation of a crawler tread mechanism embodying the present invention, the truck frame appearing in longitudinal section and being considerably foreshortened to facilitate illustration.

Fig. 2 is a fragmentary view in elevation of the periphery of a driving tumbler.

Fig. 3 is a view in plan of a pair of connected tread shoes constituting parts of the tread belt.

Fig. 4 is a detail sectional view, on a larger scale, taken along the line 4—4 of Fig. 1 through the rim of the idler tumbler and coacting tread shoe.

Fig. 5 is a detail sectional view on the line 5—5 of Fig. 1 with a portion of the tread shoe shown in dot-dash lines.

Figs. 6 and 7 are detail sectional views taken along the lines 6—6 and 7—7, respectively, of Fig. 1 through the rim of the driving tumbler.

The crawler tread mechanism shown includes a truck frame 10 of conventional design which is supported primarily by the usual series of intermediate rollers, one of which is shown at 11. In this instance the truck frame is additionally supported upon a driving tumbler 12, keyed to a drive shaft 13, journalled in a well known manner in one end of the frame, and also upon an idler tumbler 14 on a shaft 15 similarly journalled in the opposite end of the frame.

A series of tread shoes 16 hingedly connected in the usual manner by hinge pins 17, form an endless tread belt which is trained about the tumblers, and which coacts with the tumblers and intermediate rollers to provide an endless track therefor. In this instance each shoe 16 is provided with an integral upstanding or inwardly directed flange 18 extending lengthwise of the shoe and having substantially flat inclined end faces 19 which are disposed adjacent the hinge connections, but which, for purposes which will later appear, are spaced from the corresponding end faces on the next adjacent shoes. The flanges 18 are disposed centrally of the shoes, and at each side thereof flat surfaces 20 are provided on the face of each shoe. The surfaces 20 constitute tracks or paths for the intermediate rollers 11, and the flanges 18 which project therebetween function as guides for the rollers.

The flanges 18 also serve as supports upon which the tumblers 12 and 14 ride, and in order to afford a substantial bearing area therebetween the top or inner face 21 of each flange is shaped to match a substantial portion of the periphery of each tumbler. In the tread mechanism shown the tumbler peripheries are circular and the several faces 21 are therefore correspondingly longitudinally curved to match the same, although the faces may be designed to match the tumbler periphery regardless of the contour thereof. As indicated, particularly in Fig. 3, each bearing face 21 is relatively narrow, as a deterrent against lodgement and consequent packing of dirt or other foreign materials thereon during operation, and each sufficiently extended longitudinally to afford ample bearing area to sustain the heavy bearing loads with minimum wear. In this instance the side faces of each flange 18 are bevelled off, as indicated at 22 in Figs. 1 and 3, so that the flange assumes an upwardly or inwardly tapered form, the areas 22 being of substantially conical contour.

The idler tumbler, shown at 14, is provided with a relatively narrow circular tread rim 23 formed integral with and supported by and between a series of spokes 24 of H-section which radiate from a hub 25 formed integral therewith. The spokes 24 extend beyond the rim 23 and support a pair of laterally spaced guide flanges 26 formed integral therewith. The rim 23 is designed to match and ride upon the bearing faces 21 of the shoe flanges 18; and the guide flanges 26 coact with the shoe flanges 18 to insure proper registration between the periphery of rim 23 and the bearing faces 21. The guide flanges 26 are spaced from the rim 23 to afford relatively large openings 27 therebetween to permit free exit of dirt and other materials from between the rim 23 and faces 21. The tread rim 23 and guide flanges 26 are preferably joined at intervals by integral transverse bars or straps 28 to stiffen and strengthen the same, and at the juncture thereof with each spoke the rim and flanges are joined by webs 29 which merge therewith, as indicated in Fig. 5.

The driving tumbler, shown at 12, is also provided with a circular tread rim 30 formed integral with and supported by a series of spokes 31 of H-section which radiate from a hub 32. The circular contour of rim 30 is interrupted by a series of integral driving lugs 33 which project radially therefrom and which are preferably so disposed as to constitute extensions of the spokes 31. The driving lugs are so spaced as to engage successively between the flanges 18 of successive shoes 16, the opposite faces 34 of each lug being substantially flat and adapted for full face contact with the end faces 19 of the flanges 18. A positive driving engagement between the driving tumbler and tread belt is thus assured.

The circular tread rim 30 of the driving tumbler rides upon the curved bearing faces 21 of the flanges 18, and outwardly divergent guide lugs 35, projecting from opposite sides of the tread rim, coact with the flanges 18 to insure proper registration between the rim and faces 21. In the tread mechanism shown a pair of opposed guide lugs 35 is disposed between successive driving lugs 33, the opposed guide lugs of each pair being staggered, as indicated, to insure freedom of discharge of foreign materials from the face of the rim 30, each guide lug being spaced from the adjacent driving lug for the same purpose.

In order to further encourage and facilitate the extrusion of foreign matter from the tread rim 30 a portion of the rim opposite each guide lug 35 is bevelled off, as indicated at 36 in Figs. 2, 6 and 7, in such manner as to retain a relatively narrow bearing face 37 for contact with the bearing face 21. With the face of the rim 30, thus modified, staggered bearing faces 37 of narrow form are provided on the rim between each pair of driving lugs 33, as indicated in Fig. 2. The faces 37 afford ample bearing areas for transmitting the tumbler load to the coacting bearing face 21 and they cooperate with the bearing face 21 to squeeze any foreign material from between them outwardly along the bevelled faces 36.

It has been found that the guide lugs 35 tend to crowd the shoe flanges 18 laterally therefrom. To counteract this tendency the coacting driving faces 34 and 19 on the driving lugs and shoe flanges, respectively, are obliquely arranged, as indicated in Figs. 2 and 3, in such direction that the driving pressure therebetween urges the shoe flange 18 toward an adjacent guide lug 35. Ordinarily a slight obliquity of about six degrees from normal will be sufficient to center the shoe flange 18 upon the rim 30 and thereby effect favorable functioning and avoid unequal wear.

From an inspection of Fig. 1 it will be noted that the ends 38 of the driving lugs 33 do not contact with the tread shoes 16, but that ample clearance is provided therebetween to avoid clogging. It will also be noted that each driving lug 33 is somewhat narrower than the gap between adjacent ends 19 of successive shoe flanges, so that ample clearance is provided to eliminate possibility of clogging and to insure free entry of the driving lugs therebetween.

It will be further noted that the inner faces 39 of the guide flanges of the idler tumbler are conical, each lying within the surface of an imaginary cone whose axis is coincident with the axis of the tumbler. The side faces 22 of the shoe flanges 18 are also conical and of the same contour as the faces 39, so as to match the same and to thus afford a wear resistant full face bearing contact therewith throughout the length of the shoe flanges. The inner surfaces 40 of the guide lugs 35 on the driving tumbler are also conical and of the same contour so as to match the faces 22 of the shoe flanges for the same purpose.

It will also be noted that while the surfaces 22 of the shoe flanges 18 coact with the guide lugs 35 of the driving tumbler and with the guide flanges 26 of the idler tumbler to guide the same, the upright sides of those flanges at the bases thereof coact with the intermediate rollers 11 to guide the latter. Thus the bearing surfaces 21 of the flanges 18 serve only to sustain the tumbler load, the upper bevelled surfaces 22 serve only to guide the tumblers, while the lower upright sides of the flanges 18 serve only to guide the intermediate rollers 11, and the tracks 20 serve only to sustain the roller load. The wearing action of the tumblers and rollers upon the shoes is thus well distributed over separate relatively narrow surfaces on the shoes particularly well adapted to sustain such action.

With the parts combined and arranged in the manner hereinabove described, no close or accurate fitting of interengaging parts is required for satisfactory functioning. This is an important consideration in that the several parts may be inexpensively produced by ordinary casting methods and, without machining or other preliminary finishing, may be assembled into a successful operating unit.

Various changes may be made in the embodiment of the invention hereinabove specifically described without departing from or sacrificing the advantages of the invention as defined in the appended claims.

I claim:—

1. In a crawler tread mechanism the combination of an endless tread belt comprising a series of hingedly connected shoes, inwardly directed spaced longitudinal flanges on said shoes, each of said flanges having side faces and an intermediate relatively narrow elongated bearing face, a tumbler within said tread belt having a tread rim for mating engagement with said bearing faces, driving lugs on said tumbler engageable between said flanges, and two series of guide lugs at opposite sides of said rim for coaction with the side faces of said flanges, the guide lugs of each series being staggered with respect to those of the other series.

2. In a crawler tread mechanism the combination of an endless tread belt comprising a series of hingedly connected shoes, inwardly directed spaced longitudinal flanges on said shoes, each of said flanges having side faces and an intermediate relatively narrow elongated bearing face, a tumbler having a tread rim for mating engagement with said bearing faces and also having driving lugs engageable between said flanges, and two series of guide lugs at opposite sides of said rim for coaction with the side faces of said flanges, the guide lugs of each series being staggered with respect to those of the other series, limited portions of the peripheral surface of said rim opposite said guide lugs being bevelled off to facilitate extrusion of foreign materials from between said tread rim and bearing surfaces.

3. In a crawler tread mechanism the combination of an endless tread belt comprising a series of hingedly connected shoes, longitudinally spaced inwardly directed flanges on successive shoes, each of said flanges having a bearing face, a tumbler having a tread rim for mating engagement with said bearing faces, driving lugs on said tumbler engageable between said flanges and coacting therewith to propel the mechanism, and two series of guide lugs at opposite sides of said tread rim for coaction with said flanges, the guide lugs of each series being staggered with respect to those of the other series and being spaced from said driving lugs.

4. As a new article of manufacture a driving tumbler for crawler tread mechanisms said driving tumbler comprising a hub, spokes radiating from said hub, a peripheral tread rim supported by said spokes, said spokes extending beyond said rim to form driving lugs, and pairs of guide lugs disposed in staggered relation at opposite sides of said rim between successive driving lugs and spaced from the latter.

5. As a new article of manufacture a driving tumbler for crawler tread mechanisms comprising a hub, spokes radiating from said hub, a driving lug formed on the end of each of said spokes, and pairs of guide lugs between successive driving lugs and disposed in staggered relation at opposite sides of the central plane of said spokes, each of said driving lugs having a pair of oppositely disposed driving faces each inclined relative to said plane so as to form an angle of less than ninety degrees with the guiding face of the adjacent guide lug.

6. In a crawler tread mechanism the combination of an endless tread belt comprising a series of hingedly connected shoes, a pair of tumblers, and a series of longitudinally spaced upstanding track members on said shoes upon which said tumblers ride, each of said track members having a pair of side surfaces and also having a narrow elongated bearing surface between said side surfaces and shaped to make full length contact with the tumbler peripheries, said side surfaces of said members coacting with said tumblers to guide the same.

7. In a crawler tread mechanism the combination of an endless tread belt comprising a series of hingedly connected shoes, a pair of tumblers having substantially circular tread rims, a series of longitudinally spaced upstanding track members on said shoes upon which said tread rims ride, each of said track members having a pair of side surfaces and also having a narrow bearing surface between said side surfaces and longitudinally curved to match said tread rims and to thereby provide peripherally extended contact therewith to sustain the tumbler load, and guide means on said tumblers coacting with said side surfaces.

8. In a crawler tread mechanism the combination of an endless tread belt comprising a series of hingedly connected shoes, end tumblers and intermediate rollers coacting therewith, and a series of longitudinally spaced upstanding track members centrally disposed on said shoes and upon which said tumblers ride, each of said track members having a pair of side surfaces coacting with said tumblers to guide the same and also having a narrow elongated bearing surface between said side surfaces and shaped to make full length contact with the tumbler peripheries to sustain the tumbler load, said shoes having surfaces disposed at opposite sides of said track members forming runways for said intermediate rollers.

9. In a crawler tread mechanism the combination of an endless tread belt comprising a series of hingedly connected shoes, end tumblers and intermediate rollers coacting therewith, a series of upstanding track members on said shoes, each of said track members having side surfaces for guiding said tumblers and an intermediate surface on which said tumblers ride, said shoes also having surfaces disposed laterally of said track members upon which said rollers ride, and additional side surfaces on said track members coacting with said rollers to guide the same.

10. In a crawler tread mechanism the combination of an endless tread belt comprising a series of hingedly connected shoes, a pair of tumblers, a series of longitudinally spaced upstanding track members on said shoes upon which said tumblers ride, each of said track members having a pair of side surfaces and an intermediate elongated bearing surface shaped to make full length contact with the tumbler peripheries, guide means on said tumblers coacting with said side surfaces, and driving lugs projecting beyond the periphery of one of said tumblers and engageable between successive track members to propel the mechanism.

11. In a crawler tread mechanism the combination of an endless tread belt comprising a series of hingedly connected shoes, a series of longitudially spaced track members on said shoes, a pair of tumblers having substantially circular peripheries riding on said members, each of said members having a pair of side surfaces coacting with said tumblers to guide the same and also having an intermediate bearing surface longitudinally curved to provide peripherally extended bearing contact with said tumblers, and driving lugs extending beyond the periphery of one of said tumblers and projecting between the ends of successive track members to propel the mechanism.

12. In a crawler tread mechanism the combination of an endless tread belt comprising a series of hingedly connected shoes, a series of upstanding longitudinally spaced track members on said shoes, a pair of tumblers having circular tread rims riding on said members, each of said track members having a pair of sloping sides and also an intermediate elongated narrow bearing face curved to match said tread rims to thereby make peripherally extended bearing contact therewith, each of said members also having a pair of sloping end faces, and a series of tapered driving lugs projecting radially beyond the tread rim of one of said tumblers and engageable between the end faces of successive track members to propel the mechanism.

13. In a crawler tread mechanism the combination of an endless tread belt comprising a series of hingedly connected shoes, a series of upstanding track members on said shoes, a pair of tumblers riding on said members, each of said members having sloping side surfaces and also having a relative narrow intermediate face adapted to make full length bearing contact with the peripheries of said tumblers, and guide means on said tumblers coacting with said side surfaces, said guide means being arranged to provide outlet openings for the free lateral escape of foreign material from between said members and tumblers.

14. In a crawler tread mechanism the combination of an endless tread belt comprising a series of hingedly connected shoes, a series of upstanding track members on said shoes, a pair of tumblers having tread rims riding on said members, each of said members having side surfaces and also an intermediate narrow face adapted to make full length bearing contact with said tread rims, and a pair of spaced guide flanges disposed beyond the tread rim of one of said tumblers for coaction with said side surfaces, said flanges having openings to permit the free discharge of foreign material from between the tumblers and members.

GEORGE C. JETT.